US009618796B2

(12) United States Patent
Zhang

(10) Patent No.: US 9,618,796 B2
(45) Date of Patent: Apr. 11, 2017

(54) METHOD FOR ALIGNING LIQUID CRYSTAL OF PSVA LIQUID CRYSTAL DISPLAY DEVICE

(71) Applicant: SHENZHEN CHINA STAR OPTOELECTRONICS TECHNOLOGY CO., LTD., Shenzhen, Guangdong (CN)

(72) Inventor: Xin Zhang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 279 days.

(21) Appl. No.: 14/382,977

(22) PCT Filed: May 15, 2014

(86) PCT No.: PCT/CN2014/077597
§ 371 (c)(1),
(2) Date: Sep. 4, 2014

(87) PCT Pub. No.: WO2015/168960
PCT Pub. Date: Nov. 12, 2015

(65) Prior Publication Data
US 2016/0231603 A1    Aug. 11, 2016

(30) Foreign Application Priority Data

May 9, 2014   (CN) .......................... 2014 1 0197129

(51) Int. Cl.
*G02F 1/1337* (2006.01)
*G02F 1/1343* (2006.01)
(Continued)

(52) U.S. Cl.
CPC .......... *G02F 1/1337* (2013.01); *G02F 1/1368* (2013.01); *G02F 1/133753* (2013.01);
(Continued)

(58) Field of Classification Search
CPC ................. G02F 1/1337; G02F 1/1368; G02F 1/134309; G02F 1/133788; G02F 1/133514; G02F 2001/133742
See application file for complete search history.

(56) References Cited

U.S. PATENT DOCUMENTS

2003/0043336 A1* 3/2003 Sasaki ............... G02F 1/133788
349/187
2011/0096281 A1  4/2011  Ting et al. .................... 349/144
2011/0149224 A1  6/2011  Tseng et al. .................. 349/144

FOREIGN PATENT DOCUMENTS

CN          1403859 A       3/2003

* cited by examiner

*Primary Examiner* — Donald Raleigh
*Assistant Examiner* — Kevin Quarterman
(74) *Attorney, Agent, or Firm* — Stein IP, LLC

(57) ABSTRACT

The present disclosure discloses a method for aligning liquid crystals of a PSVA liquid crystal display device, including the steps of: providing a first voltage to a gate of a thin film transistor for enabling it in a turn-on state; applying a second voltage to the source of the thin film transistor, and applying a third voltage to a color filter side common electrode and an array side common electrode, so as to generate an alternating current voltage difference between the source and the color filter side common electrode, and enable the liquid crystal molecules to be arranged according to predefined direction angles; curing the liquid crystal molecules. The method may enable the alignment of the liquid crystal molecules to be ideal, which is advantageous to the subsequent process of tilt angles, so as to enhance the efficiency and effect of the liquid crystal display.

5 Claims, 7 Drawing Sheets

(51) Int. Cl.
  *G02F 1/1368* (2006.01)
  *G09G 3/36* (2006.01)
  *G02F 1/1335* (2006.01)
(52) U.S. Cl.
  CPC .. *G02F 1/133788* (2013.01); *G02F 1/134309* (2013.01); *G09G 3/3655* (2013.01); *G02F 1/133514* (2013.01); *G02F 2001/133742* (2013.01); *G02F 2001/133769* (2013.01); *G02F 2001/134381* (2013.01); *G09G 2300/0876* (2013.01)

--Prior Art--

--Prior Art--

--Prior Art--

--Prior Art--

METHOD FOR ALIGNING LIQUID CRYSTAL OF PSVA LIQUID CRYSTAL DISPLAY DEVICE

FIELD OF THE INVENTION

The present disclosure relates to the technical field of liquid crystal display, in particular to method for aligning liquid crystal of a PSVA liquid crystal display device.

BACKGROUND OF THE INVENTION

At present, thin film transistor liquid crystal displays (TFT-LCD) have gradually occupied the predominance in the field of displays. A liquid crystal vertical alignment (Vertical Alignment, VA) technology is often adopted in the TFT-LCD to realize wide view angles. In the VA technology, a multi-domain vertical alignment (MVA) technology, an electrode pattern vertical alignment (PVA) technology and a polymer stabilized vertical alignment (Polymer Stabilized Vertical Alignment, PSVA) technology are developed according to different application occasions.

Similar to the other technology, the PSVA technology also needs a step of processing pre-tilt angle of liquid crystal molecules. Before this step, disordered liquid crystal molecules are arranged first in a certain form according to a designed electrode shape. Then, the arranged liquid crystal molecules are irradiated by adopting energy light such as ultraviolet for curing. In the above-mentioned process, no matter whether the alignment arrangement of the liquid crystal molecules is satisfying, the alignment condition of the liquid crystal molecules after being cured is completely memorized in a liquid crystal cell. If the arrangement of liquid crystal is poor during alignment, dark lines 101 shown in FIG. 1 may appear. It could be seen that, the dark lines are most obvious at the edges of each sub-pixel unit. This will reduce the efficiency of the liquid crystal, even result in non-uniform brightness of a display such as mura and the like, and thus affect the display of the LCD.

In the existing PSVA manufacturing process, there are many excuses for the poor tilt direction of the liquid crystal. For example, with respect to common electrodes in certain shapes, the edge electric fields generated by themselves are not as good as the middle electric fields, so that the arrangement condition of the liquid crystal molecules at the edges of each sub-pixel is less than satisfactory.

Therefore, with respect to the problem that the tilt direction of the liquid crystal molecules is not satisfying during processing liquid crystal molecule pre-tilt angle, there is a need for providing a new method to align liquid crystals for a PSVA liquid crystal display device.

SUMMARY OF THE INVENTION

With respect to the problem that the alignment arrangement of liquid crystal is not satisfying during the procedure of PSVA, the present disclosure provides a method for aligning liquid crystals of a PSVA liquid crystal display device, including the following steps:

providing a first voltage to the gate of a thin film transistor corresponding to each pixel unit, so that the thin film transistor is in a turn-on state;

applying a second voltage to the source of the thin film transistor corresponding to each pixel unit, and applying a third voltage to a color filter side common electrode and an array side common electrode, so as to generate an alternating current voltage difference between the source and the color filter side common electrode during alignment of liquid crystal molecules, and enable the liquid crystal molecules arranged according to predefined direction angles;

curing the liquid crystal molecules arranged according to the predefined direction angles by adopting energy light.

According to an embodiment of the present disclosure, the first voltage is a continuous direct current voltage, so that the thin film transistor is turn on.

According to an embodiment of the present disclosure, the first voltage is a periodic pulse voltage, so that the thin film transistor is in a periodic turn-on state due to the arriving pulses.

According to an embodiment of the present disclosure, the predefined direction angle is related to the structure of a pixel electrode of the PSVA liquid crystal display device.

According to an embodiment of the present disclosure, the pixel electrode of the PSVA liquid crystal display device is designed as a structure with a shape of the Chinese character "米", including a middle vertical trunk, a middle horizontal trunk and branches which extend from the trunks and form certain angles with the trunks.

According to an embodiment of the present disclosure, the angles are 45 degrees.

According to an embodiment of the present disclosure, the source of the thin film transistor is grounded, and the third voltage is an alternating current voltage.

According to an embodiment of the present disclosure, the second voltage is an alternating current voltage, and the color filter side common electrode and the array side common electrode are grounded.

According to an embodiment of the present disclosure, the PSVA liquid crystal display device is irradiated by adopting ultraviolet light for alignment curing.

Compared with the prior art, the present disclosure has the following advantages. The method of the present disclosure may enable the alignment of the liquid crystal molecules to tend to be more satisfying, and thus discontinuous lines and dark lines may be supressed significantly, the display efficiency of liquid crystal be improved, meanwhile, the non-uniform brightness condition of the display may be reduced, and the display effect of the LCD can be improved.

Other features and advantages of the present disclosure will be set forth in the following description, and in part will be made obvious from the description, or be learned by implementing the present disclosure. The objectives and other advantages of the present disclosure may be achieved and obtained by steps particularly pointed out in the description, the claims and the accompanying drawings.

BRIEF DESCRIPTION OF THE DRAWINGS

The accompanying drawings are configured to provide a further understanding of the present disclosure, constitute a part of the description, and explain the present disclosure together with the embodiments of the present disclosure without limiting the present disclosure. In the accompanying drawings.

DETAILED DESCRIPTION OF THE EMBODIMENTS

Figure 1:
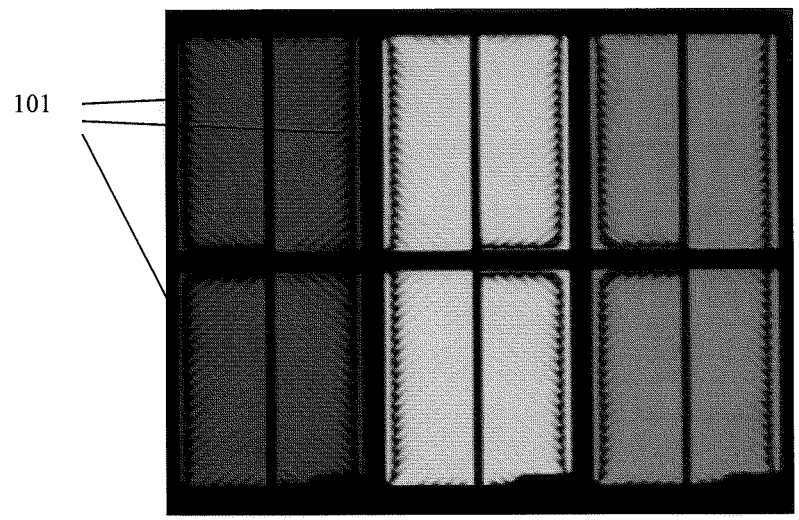
FIG. 1 shows a display picture of a pixel unit with poor alignment of liquid crystal molecules caused in PSVA process.

A detailed description of the implementations of the present disclosure will be given below, in combination with the accompanying drawings and embodiments. Therefore, an implementation process of how to use technical means of the present disclosure to solve technical problems and achieve a technical effect may be fully understood and implemented accordingly. It should be noted that, as long as no conflict is generated, various embodiments of the present disclosure and various features of the embodiments may be combined with each other, and the formed technical solutions are all within the protection scope of the present disclosure.

A liquid crystal display (LCD) includes a pair of panels provided with field generation electrodes such as a pixel electrode and a common electrode, and a liquid crystal layer arranged between the two panels. When a voltage is applied to the pixel electrode and the common electrode, an electric field is generated in the liquid crystal layer, and this electric field determines the orientation of liquid crystal molecules in the liquid crystal layer, so as to adjust the polarization of light entering the liquid crystal layer, and thus enable the LCD to display.

A pre-tilt angle of liquid crystal molecules is one important parameter of a liquid crystal display panel. The pre-tilt angle refers to orientation angles of the liquid crystal molecules in the liquid crystal display panel before powered on. The liquid pre-tilt angle may control an anti-tilt domain which can reduce the contrast of the liquid crystal display panel. In other words, if no process to pre-tilt angle of liquid crystal molecules, they will be andomly oriented to form some small anti-tilt domains. Due to different optical refractive indexes of the small domains, stripes will appear in the images to be displayed. The importance of pre-tilt processing also lies in that the pre-tilt angle may also affect a curve of transmission versus voltage to some extent.

For multiple types of LCD, in order to obtain proper electro-optical properties and visibility, the liquid crystal layer is required to have a determined non-zero pre-tilt angle.

In the PSVA process, a monomeric compound with a proper concentration is added into liquid crystal materials, and the mixed liquid crystal is oscillated to a uniform state. Next, the mixed liquid crystal material is put on a heater and heated to an isotropic state. When the liquid crystal mixture is cooled to room temperature, the liquid crystal mixture returns to a nematic state. Then, the liquid crystal mixture is injected to a liquid crystal cell and applied with a voltage. When the liquid crystal molecules are arranged stably by applying the voltage, the monomeric compound is subjected to polymerization reaction by ultraviolet light or by means of heating to form a polymer layer, thus achieving the purpose of stable alignment.

In the PSVA technology, TFT electrodes with slits are used to control tilting of liquid crystal molecullars. Moreover, photosensitive polymer is added into the liquid crystal material. After assembling a PSVA liquid crystal panel, an electric field is applied to tilt the liquid crystal, and ultraviolet light is used to make the photosensitive polymer in the liquid crystal into reaction, so as to generate a pre-tilt angle of liquid crystal along the driving direction of the electric field, and achieve a multi-domain property. Therefore, compared with MVA and PVA technologies, the PSVA has the advantages of good black state, short response time, high transmittance, low cost and the like.

In view of the above, the present disclosure is directed to a improved method for manufacturing a liquid crystal display device using the PSVA technology, particularly a method for aligning liquid crystal molecule alignment before processing the pre-tilt angle. For making the principle of the present disclosure more clear, the influence of an electric field generated by each electrode of a pixel unit on the arrangement of liquid crystal molecules in the prior art will be illustrated below.

Figure 2:
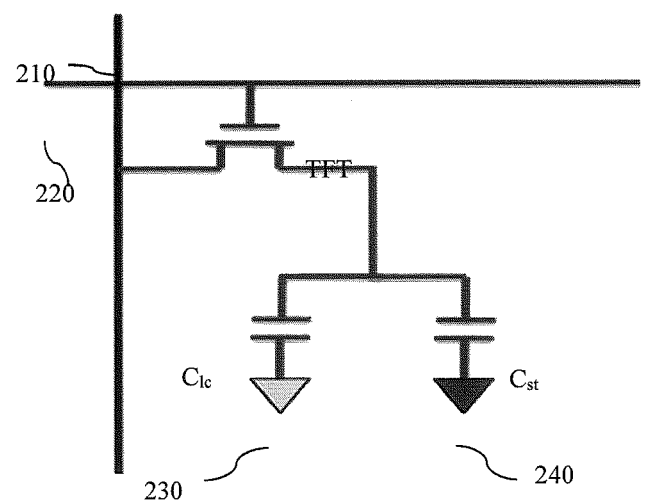
FIG. 2 shows an equivalent circuit of a pixel unit in the prior art.

FIG. 2 shows an equivalent circuit of a pixel unit in the prior art. As shown in FIG. 2, a voltage is applied to a liquid crystal cell through a pixel electrode and common electrode CF Com 230 at a color filter side, so that liquid crystal molecules in the liquid crystal cell can be driven by an electric field of charges accumulated in Clc to rotate. In this example, it can be seen that the pixel electrode covers an common electrode A Com 240 at an array side to form a storage capacitor Cst, which can also be seen from FIG. 3 and FIG. 4. In the equivalent circuit as shown in FIG. 2, the pixel electrode is invisible, and is equivalent to an electrode of the capacitor Clc. The electrode is connected to a data line of an array substrate when a TFT switch is turned on.

In an example, if the liquid crystal molecules need to be aligned, generally a voltage is applied between the pixel electrode and the common electrode 230 at the color filter side, so that the desired electric field is generated on the liquid crystal cell, and the liquid crystal molecules in the liquid crystal cell can be driven by the voltage to rotate. The rotating direction angles of the liquid crystal molecules are determined by the structure of the pixel electrode of a PSVA liquid crystal display device. On the other hand, generally for simplifying the operation in the prior art, signals are not applied to the array. For example, the simplest condition is that a data line 210 and a gate line 220 are suspended, and the TFT is in a turn-off state. To enable the liquid crystal molecules to tilt according to a predefined direction, alternating current signals may be applied between the CF Corn 230 and the A Corn 240 to form an alternating current voltage difference therebetween. The alternating current voltage difference further forms an electric field enabling the liquid crystal molecules to rotate.

The above method is widely applied for its simplicity. However, during alignment, since the voltage difference exists only between the CF Com 230 and the A Com 240, the electric field at the edges of pixels is not satisfying under the common electrode design of some conditions, and thus the alignment effect of the liquid crystal molecules is affected. Poor alignment of the liquid crystal molecules directly affects subsequent pre-tilt angle processing.

Figure 3:
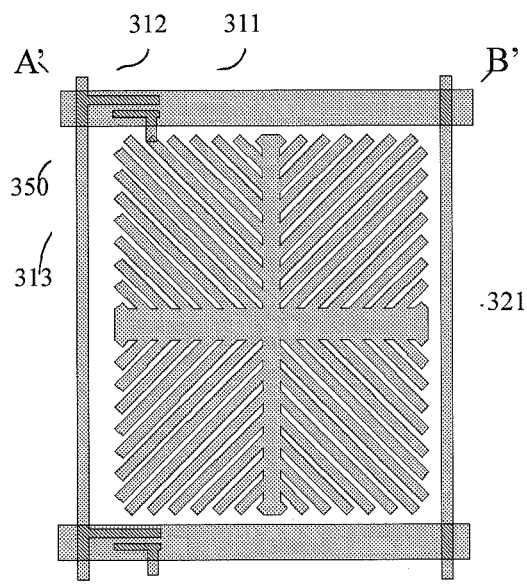
FIG. 3 schematically shows a structural diagram of a pixel electrode in the prior art.

The design of the pixel electrode, which affects the alignment of the liquid crystal molecules, will be illustrated below. As shown in FIG. 3, it shows a structure of a pixel electrode in the prior art. It can be seen that, the pixel electrode 321 is designed as a structure with a shape of the Chinese character "米", including a middle vertical trunk, a middle horizontal trunk and branches which extend from the trunk respectively and form certain angles with these trunks. Preferably, the angles between these branches and the trunks are 45 degrees. As shown in the figure, the middle vertical trunk and the middle horizontal trunk averagely divide the area of the whole pixel electrode into four pixel electrode areas, and these areas include the extended strip branches which are collectively called as branch portions. In an alternative embodiment, these strip branches may be spread and located on the same plane as the vertical trunk and the horizontal trunk.

In the structure shown in FIG. 3, the source 312 of a thin film transistor TFT of a pixel unit is in electrical contact with a data line 350. The gate (not shown) of the thin film transistor of the pixel unit is in electrical contact with a scan line or a gate line 311 of a liquid crystal panel. The drain of the thin film transistor 313 is in electrical contact with the branch portions of the pixel electrode 321.

Figure 4:
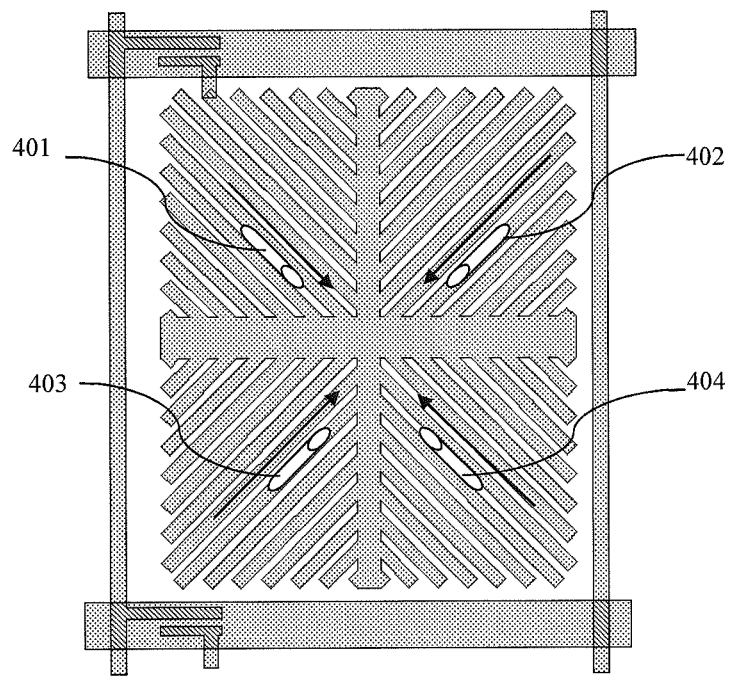
FIG. 4 schematically shows a structural diagram labelling the arrangement direction of a liquid crystal molecule with respect to FIG. 3.

For the pixel electrode with such a shape, generally the liquid crystal molecules should gradually tilt from the outer side of the pixel electrode to the inner side of the pixel electrode. The direction angles tilting consistently are related to the angles between the branches and the horizontal trunk. For example, as shown in FIG. 4, from the direction vertical to the plane where the pixel electrode is located, liquid crystal molecules, if the pixel electrodes are electrified, will tilt from the outer side of the pixel electrode to the inner side, as shown by arrows 401, 402, 403, and 404. The tilt angles are toward the notch directions. The liquid crystal tilt directions of four areas are respectively ±45 degrees or ±135 degrees (relative to the middle horizontal trunk). Such angles indicate that, all the liquid crystal molecules point to the central area of the pixel unit in which the middle horizontal trunk and the middle vertical trunk intersect.

The direction angles of the liquid crystal shown in FIG. 4 are ideal. However, in the practical process, the tilt directions of the liquid crystal molecules are not completely matched with the above-mentioned angles. The more the tilt directions of the liquid crystal molecules are matched with the above-mentioned angles, the more ideal the display effect of the liquid crystal pixel unit is.

Figure 5A:
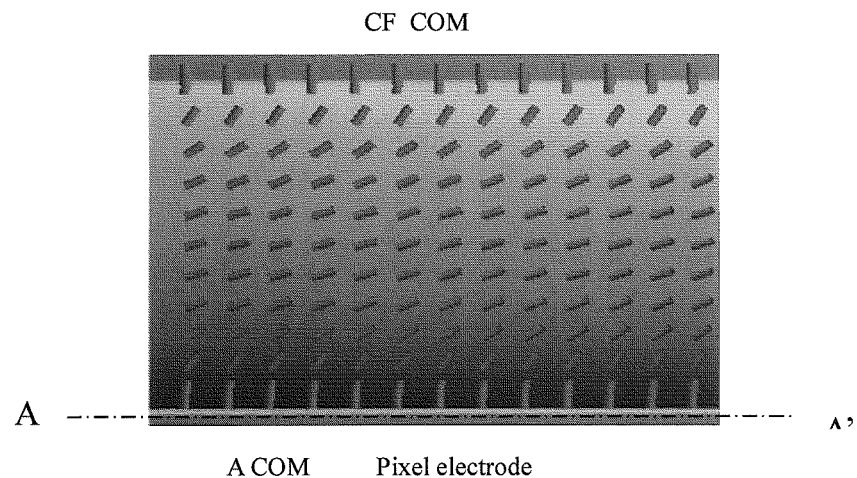
FIG. 5a and FIG. 5b are cross-sectional views of a pixel unit along the line AA' and BB' in FIG. 3.
Figure 5B:
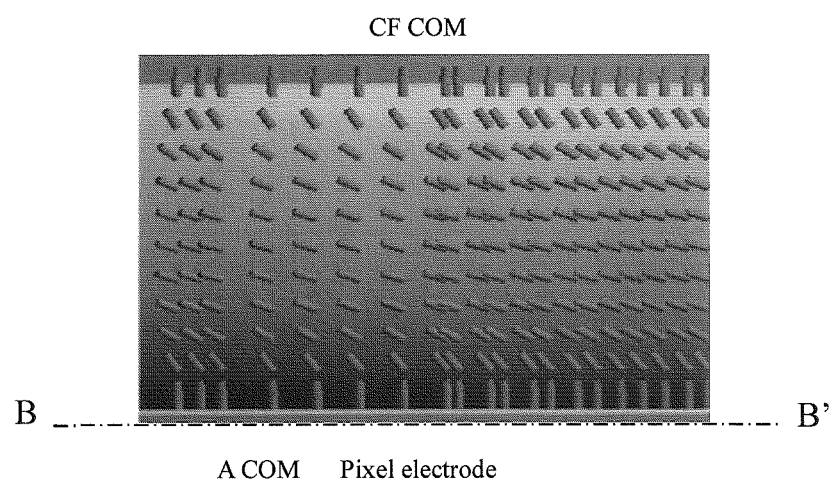

For further illustrating the principle, see FIG. 5a and FIG. 5b which are cross-sectional diagrams of a pixel unit along dotted lines AA' and BB' in FIG. 3. The liquid crystal tilt directions in the cross section of the pixel unit are shown in the figures. The liquid crystal tilts to the inner part of the pixel unit, but does not completely strictly tilt according to the angles shown in FIG. 4. Large deviation of the tilt angles of the liquid crystal molecules will cause the condition shown in FIG. 1. FIG. 1 is a pixel unit on a liquid crystal panel observed in the direction vertical to the plane where the pixel electrode is located through a microscope.

A liquid crystal molecule pre-tilt angle processing step is needed in the PSVA manufacturing process of the present disclosure. In this step, the liquid crystal molecules first deflect according to certain angles, and then the deflection angles of the liquid crystal molecules are cured. No matter whether the alignment of the deflection angles of the liquid crystal molecules is ideal in the above-mentioned process, the alignment condition of the liquid crystal molecules is completely memorized in a liquid crystal cell after being cured. Therefore, if the tilt direction of the liquid crystal may tend to an ideal mode as much as possible, the transmittance of a liquid crystal screen may be improved, and thus the display effect of the liquid crystal screen is improved.

As mentioned above, in the prior art, the alignment of liquid crystal molecules before the process of pre-tilt angle is implemented generally by applying the alternating current voltage between the color filter side common electrode and the array side common electrode. During this process, the gate and source of the thin film transistor TFT are suspended, and an alternating current voltage difference is applied between the color filter side common electrode 222 and the array side common electrode 232. Such alternating current voltage difference may cause non-ideal edge electric field of the pixel unit depending on different common electrode structures.

Figure 6:
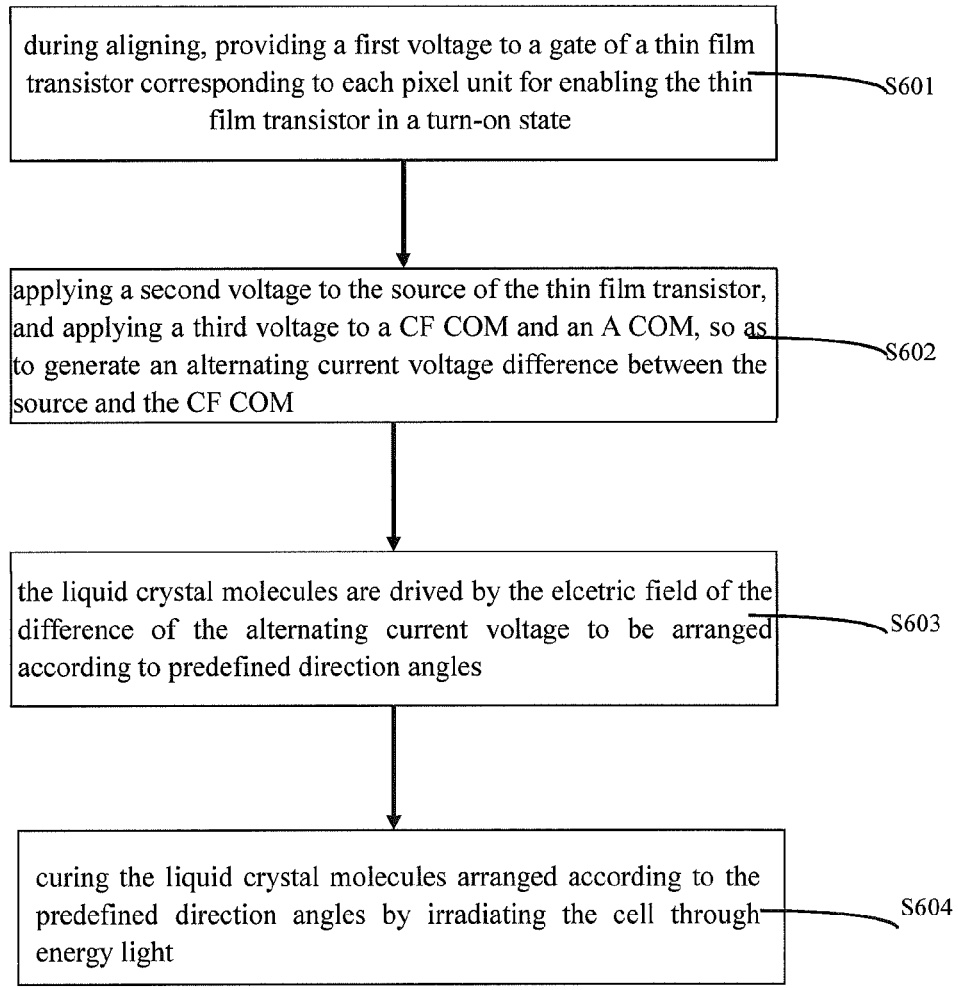
FIG. 6 is a flow chart of a method for aligning liquid crystals according to the concept of the present disclosure.

To improve the edge electric field, the present disclosure provides an method for aligning liquid crystal molecules. The flow chart of this method is shown in FIG. 6. The method of the present disclosure begins with step S601. In step S601, a first voltage is provided to the gate of a thin film transistor corresponding to each pixel unit, so that the thin film transistor is turn on. It should be noted herein that, the first voltage may be a continuous direct current voltage signal or a pulse voltage signal. As long as the thin film transistor is in a turn-on state and even in a micro turn-on state during alignment, the present disclosure may be realized. Therefore, the specific value of the first voltage is not limited herein. Of course, in a practical application, if the direct current voltage signal is provided to a gate line, in order to ensure that the subsequent process and display effect are not affected, the value of the voltage should not exceed the voltage value needed during display drive. If the periodic pulse signal is provided to the gate line, the period of the pulse signal may be determined according to the time required for alignment.

In step S602, a second voltage is applied to the source of the thin film transistor corresponding to each pixel unit, and meanwhile, a third voltage is applied to a common electrode at the color filter side and an common electrode at the array side, so that an alternating current voltage difference can be produced between the source of the thin film transistor and the common electrode at the color filter side during alignment of liquid crystal molecules, and then the liquid crystal molecules are arranged according to predefined direction angles (in step S603). Generally, the direction angles are limited by the shape of the pixel electrode. For the above-mentioned structure in the shape of the Chinese character "※", according to the method of the present disclosure, nearly all the liquid crystal molecules including the pixel edges tilt towards the trunks of the structure. In one case, the tilting direction angles are 45 degrees, for example. Those skilled in the art may understand that the angles are not definite and may be changed according to the practical condition.

Figure 7A:
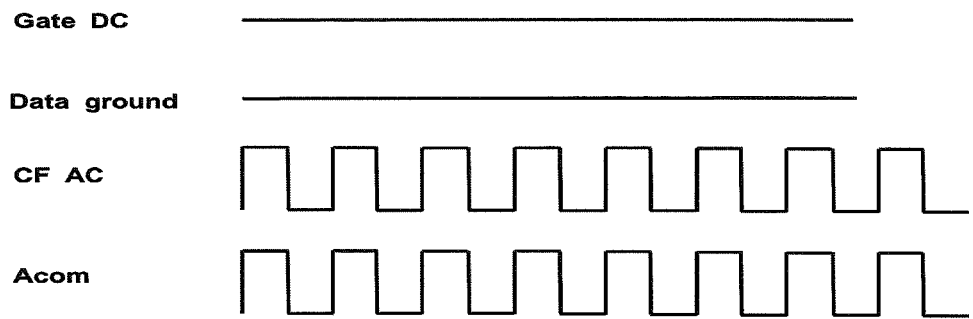
FIG. 7a to FIG. 7d schematically shows diagrams which indicates that different voltages are applied to different electrodes according to the present disclosure.

In this embodiment, the second voltage provided to the source may be provided by the data line of the array substrate. The present disclosure is mainly characterized by forming the alternating current voltage difference between the common electrode at the CF side and the pixel electrode under the condition that the pixel thin film transistor is in a turn-on or micro turn-on state, thus forming the desired electric field. Therefore, under the condition that the transistor is turned on, the voltage on the data line, namely the second voltage, may be a grounded voltage, and the third voltage provided to the common electrode at the CF side is a sequence of alternating pulse voltage signals based on the grounded voltage. In order to eliminate the influence of the electric field between the two common electrodes on the pixel edge electric field, the same pulse voltage signals are also applied to the common electrode at the array side, as shown in FIG. 7a.

Figure 7B:
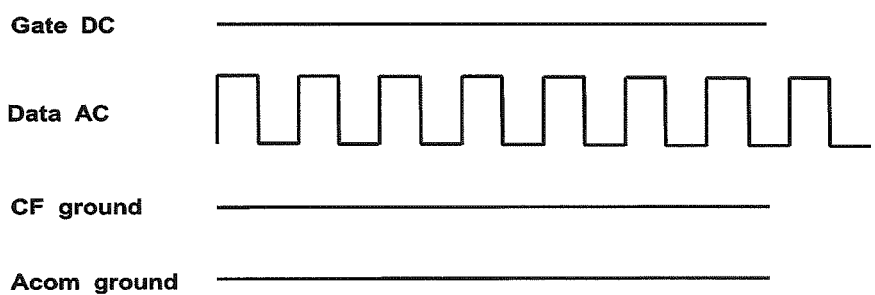

In another embodiment, the voltages may be applied to different electrodes in a manner similar to FIG. 7b. For example, contrary to the above, the third voltage provided to the common electrode at the CF side and the common electrode at the array side is a grounded voltage, and the second voltage provided to the data line (that is, the pixel electrode if the TFT is turned on) is a sequence of alternating pulse voltage signals based on the grounded voltage. Herein, the reference point serving as the alternating current voltage difference is set as the grounded voltage, for the purpose of convenience of implementation. In fact, the present disclosure is not limited to this. Under some conditions, the third voltage may not be grounded, and is applied with a pulse voltage sequence of which the phase is opposite to that of the second voltage.

Figure 7C:
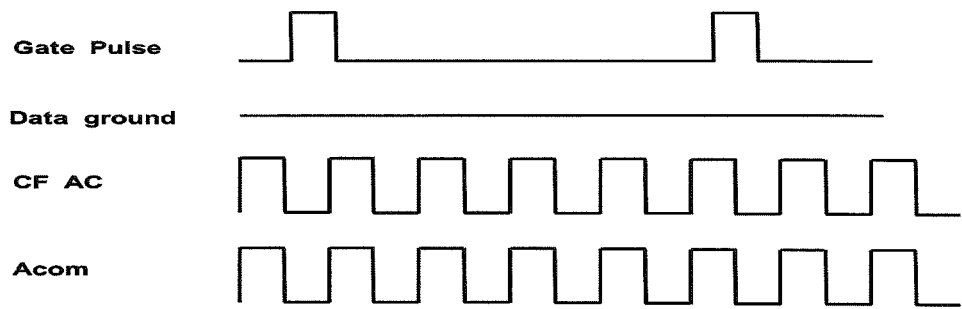
Figure 7D:
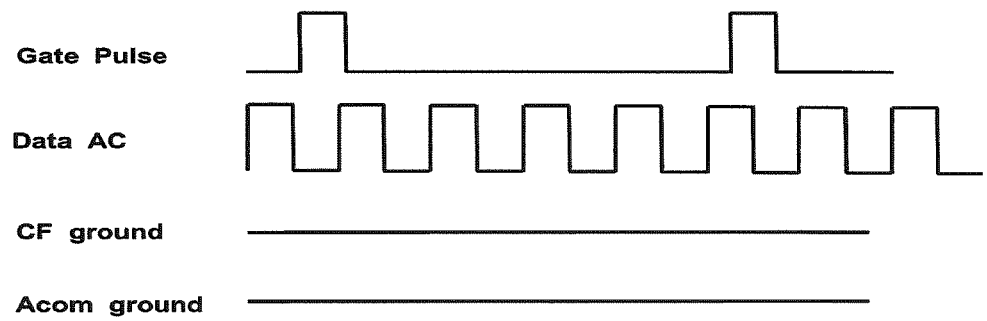

FIG. 7c and FIG. 7d show a condition that the first voltage provided to the gate line is a pulse signal. In this example, the turn-on or micro turn-on time of the thin film transistor is relatively short, so there is a certain requirement for the curing time. It is not redundantly described herein.

Turning back to FIG. 6, after the voltages are provided to the electrodes in the above several manners, the liquid crystal molecules tilt according to predefined direction angles, for example, towards the middle area of the pixel. Finally, in step S604, the liquid crystal molecules arranged according to the predefined direction angles are cured by adopting energy light, such as ultraviolet. There are many curing processes, and the present disclosure adopts the ultraviolet light to irradiate the liquid molecules. It is obvious that any curing manner may be used for the present disclosure.

Figure 8:
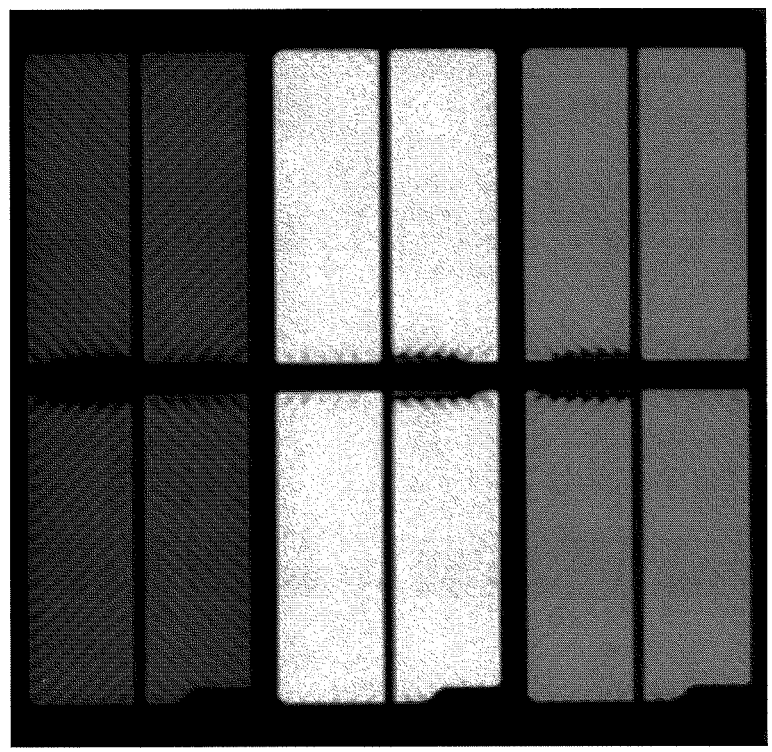
FIG. 8 is a diagram for showing display effect of a pixel unit in which liquid crystals are aligned by virtue of the method of the present disclosure.

As shown in FIG. 8, it is a diagram for showing display effect of a pixel unit in which liquid crystals are aligned by virtue of the method of the present disclosure, which is observed through a microscope. Compared with the condition of poor alignment in FIG. 1, dark lines are eliminated in FIG. 8, and the display effect of the pixel unit is significantly improved. Thus it can be seen that, the present disclosure may enable the alignment of the liquid crystal molecules to tend to an ideal state. This is favorable for achieving ideal pre-tilt angle processing later, so that discontinuous lines and mura are suppressed, and the efficiency and effect of liquid crystal display are further improved.

Although the implementations disclosed by the present disclosure are described above, the contents are implementations merely adopted to facilitate understanding of the present disclosure, rather than limiting the present disclosure. The method of the present disclosure may also have a plurality of other embodiments, any skilled one who is familiar with this art could make corresponding variations and substitutions according to the present disclosure without departing from the essence of the present disclosure, and these corresponding variations and substitutions shall fall within the protection scope of the claims of the present disclosure.

What is claimed is:

1. A method for aligning liquid crystals of a PSVA liquid crystal display device, including the following steps:
    providing a first voltage to a gate of a thin film transistor corresponding to each pixel unit for enabling the thin film transistor in a turn-on state;
    applying a second voltage to a source of the thin film transistor corresponding to each pixel unit, and applying a third voltage to a color filter side common electrode and an array side common electrode, so as to generate an alternating current voltage difference between the source and the color filter side common electrode during alignment of liquid crystal molecules, and enable the liquid crystal molecules to be aligned according to predefined direction angles; and
    curing the liquid crystal molecules aligned according to the predefined direction angles through energy light;
    wherein the first voltage is a continuous direct current voltage which can enable the thin film transistor in a turn-on state;
    wherein the source of the thin film transistor is grounded, and the third voltage is an alternating current voltage.

2. A method as recited in claim 1, wherein the predefined direction angle is dependent on the structure of a pixel electrode of the PSVA liquid crystal display device.

3. A method as recited in claim 1, wherein the pixel electrode of the PSVA liquid crystal display device is designed as a structure with a shape of the Chinese character "※", including a middle vertical trunk, a middle horizontal trunk and branches which extend from the trunks and form certain angles with the trunks.

4. A method as recited in claim 3, wherein the angles are 45 degrees.

5. A method as recited in claim 1, wherein the PSVA liquid crystal display device is irradiated by ultraviolet light for alignment curing.

* * * * *